United States Patent [19]

Espelage et al.

[11] Patent Number: 4,539,514
[45] Date of Patent: Sep. 3, 1985

[54] START-UP CONTROL FOR AN INDUCTION MOTOR DRIVE

[75] Inventors: Paul M. Espelage, Salem; James M. Nowak, Roanoke, both of Va.

[73] Assignee: General Electric Company, Salem, Va.

[21] Appl. No.: 627,000

[22] Filed: Jul. 2, 1984

[51] Int. Cl.³ .............................................. H02P 1/30
[52] U.S. Cl. .................................... 318/778; 318/713
[58] Field of Search ............... 318/778, 779, 705, 713, 318/714, 715, 723

[56] References Cited

U.S. PATENT DOCUMENTS

| | | | |
|---|---|---|---|
| 4,012,679 | 3/1977 | Matsuda et al. ..................... | 318/713 |
| 4,399,395 | 8/1983 | Espelage ............................. | 318/803 |
| 4,409,533 | 10/1983 | Fawabata ........................... | 318/778 |
| 4,426,611 | 1/1984 | Espelage et al. ................... | 318/803 |
| 4,443,747 | 4/1984 | Chausse et al. .................... | 318/723 |
| 4,449,087 | 5/1984 | Lippitt et al. ...................... | 318/723 |
| 4,451,112 | 5/1984 | Hattori et al. ..................... | 318/778 |

Primary Examiner—David Smith, Jr.
Attorney, Agent, or Firm—Arnold E. Renner

[57] ABSTRACT

A method of starting an AC motor from any initial speed using open loop control is provided. Sufficient current is provided to the motor so that motor flux can be developed. The frequency provided to the AC motor is varied and the stator frequency at which the motor peak flux occurs is determined. A transition to a control responsive to an external command at approximately the stator frequency at which the peak flux occurred is made.

10 Claims, 21 Drawing Figures

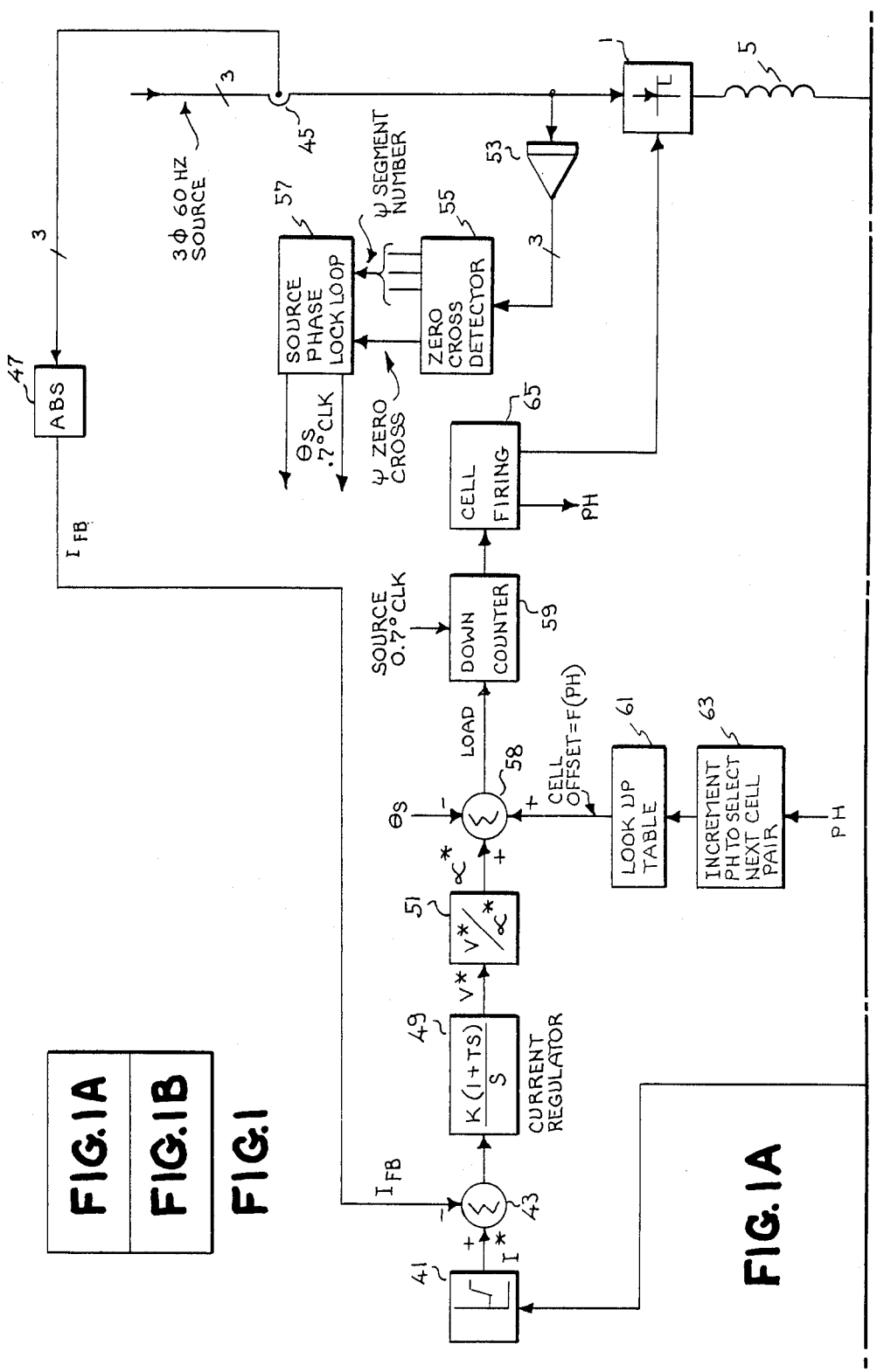

FROM FIG.3A

THE DIFFERENCE BETWEEN ACTUAL CURRENT ZERO CROSSING AND THE INTENDED ZERO CROSSING IS DETERMINED BY DIFF = I CROSS$TIME$ARRAY (ACT$PH) - UNCOR$TIME$TO$ FIRE$ARRAY(ACT$PH) CORRECT THIS VALUE OF DIFF FOR NUMERIC WRAP AROUND AND CALL THE RESULT DELTA$ DELAY$ANGLE

THE VALUE DETA$DELAY$ANG IS INPUT TO A SOFTWARE INTEGRATOR TO OBTAIN DELAY$ANG = DELAY$ANG + DELTA$DELAY$ANG THE VALUE OF DELAY$ANG IS CLAMPED BETWEEN 0° AND 120°

CALCULATE TIME$TO$FIRE = UNCOR$TIME$TO$FIRE - DELAY$ANGLE

CALCULATE TIME$TO$GO. THIS IS THE VALUE IN DEGREES TO BE LOADED INTO A DOWN COUNTER, SUCH THAT WHEN THE DOWN COUNTER CLOCKS DOWN TO ZERO COUNT, AN INTERRUPT IS GENERATED WHICH CALLS FOR THE NEXT CELL FIRING. TIME$TO$GO = TIME$TO$ FIRE - TIME$COUNTER READING. REMEMBER TIME COUNTER IS A RAMP FROM 0 TO 512 COUNTS OR $\frac{360}{512} = .703°/COUNT$

TIME$TO$GO IS CORRECTED FOR NUMERIC WRAP AROUND

IF ALREADY TOO LATE, FIRE NEXT CELL PAIR IMMEDIATELY

COMPARE TIME$TO$GO WITH THE TIME IT TAKES TO RUN ANOTHER REGULATOR CALCULATION. IF THERE IS NOT ENOUGH TIME TO RUN ANOTHER CALCULATION, THEN LOAD FIRE COUNTER WITH THE TIME TO GO. THEN LOAD THE FIRE COUNTER PRESET WITH 60° OF COUNT SUCH THAT IF FOR SOME REASON THE NEXT REGULATOR CALCULATION IS NOT COMPLETED IN TIME FOR THE NEXT FIRING, THEN THE NEXT FIRING WILL DEFAULT TO FIRING 60° LATER.

IF THE TIME$TO$GO IS GREATER THAN THE TIME TO RUN ANOTHE REGULATOR CALCULATION, THEN LOAD THE FIRE COUNTER WITH SOME VALUE (NEXT$TIME) AND LOAD THE FIRE COUNTER PRESET WITH A VALUE (TIME$TO$GO-NEXT $TIME). WHEN NEXT$TIME TIMES OUT ANOTHER REGULATOR CALCULATION WILL BE MADE AND THE FIRE COUNTER WILL BE LOADED WITH THE PRESET, SUCH THAT IF THE NEW REGULATOR CALCULATION IS NOT READY THE NEXT CELL FIRING WILL DEFAULT TO (TIME$TO$GO-NEXT$TIME)

RETURN TO "WAIT FOR INTERRUPT FROM FIRE$COUNTER"

FIG.3B

```
IF FIRSTPASS THROUGH IDLE MODE
THEN DO;
    <CALL FOR INVERSION LIMIT>
    <TURN ALL LOAD THYRISTOR GATING OFF>
    <SET THE IDLE MODE INTERRUPT FREQUENCY>
    <INITIALIZE VARIOUS OTHER VARIABLES>
    <SET FLUX$DELAY$COUNTER TO 256>
END;
<SET LOCAL$READY FALSE>
IF <THERE IS NO FLUX> /* IMPLIES MOTOR AT STANDSTILL OR ROTATING
                         BUT HAVE LOST FLUX. */
THEN DO;
    <TURN OFF ALL OTHER INTERRUPT PROGRAMS EXCEPT THIS ONE>
    <SET S$FLAG AND LOCAL$READY TRUE>
    <SET FLUX$DELAY$COUNTER TO 256>
    IF <THE DRIVE IS COMMANDED TO RUN>
    THEN DO;
        <SET LOAD$DIAMETRIC$FLAG TRUE>
        <CLEAR CALL FOR INVERSION LIMIT>
        <FIRE A LOAD SIDE DIAMETRIC FOR A GIVEN TIME>
        /* THIS PUTS A SHORT CIRCUIT ON THE LOAD SIDE, ALLOWING
           CURRENT TO FLOW IN THE DC LINK, SUCH THAT ON FIRING
           OUT OF THE DIAMETRIC, THE APPROPRIATE COMMUTATING
           CAPACITOR IS CHARGED UP ENABLING LOAD CURRENT TO
           BE COMMUTATED ON THE SUBSEQUENT FIRING. */
        IF <DIAMETRIC ON FOR SUFFICIENT TIME>
        THEN DO;
            /* PREPARE TO EXIT IDLE MODE */
            <SET IDLE MODE FIRST$PASS$FLAG TRUE>
            /* TO REINITIALIZE ON NEXT ENTRY INTO IDLE MODE */
            <SET START$UP$FIRST$PASS$FLAG TRUE>
            <CALL FOR OPEN LOOP MODE>
            <SET PH SO FIRST OPEN LOOP THYRISTOR PAIR FIRING
              CONSISTENT WITH DIAMETRIC PATH NOW CONDUCTING>
            <SET CURRENT COMMAND TO MINIMUM CURRENT LIMIT>
            OPEN$CLOSE$FLAG = FALSE ;
        END;
END;
```

FIG. 5A

```
END;
ELSE IF <A FLUX WAVE ZERO CROSSING INTERRUPT IS PENDING>
THEN DO;
      <DECREMENT THE FLUX$DELAY$COUNTER BY ONE>
      IF FLUX$DELAY$COUNTER = O
      THEN DO;
            /* HAVE FLUX, SO WILL ENABLE ALL INTERRUPTS ALLOWING
               PHASE LOCK LOOP TO START; BUT S$FLAG WILL BE SET
               PREVENTING EXIT FROM IDLE MODE UNTIL THE PHASE LOCK
               LOOP ERROR COMES WITHIN TOLERANCE.*/
            <SET S$FLAG TRUE>
            <INITIALIZE PHASE LOCK LOOP COUNTER>
            <INITIALIZE PULSE TRAIN LIMIT COUNTER WITH 30 DEG>
            <ACTIVATE LOAD SIDE PHASE LOCK LOOP INTERRUPT PROGRAMS>
      END;
END;
ELSE IF (S$FLAG = FALSE)
/* MEANS HAVE FLUX, PHASE LOCK LOOP ON, AND ITS ERROR WITHIN
   TOLERANCE.*/
THEN DO;
      LOCAL$READY = TRUE;
      IF <DRIVE IS BEING TOLD TO RUN>
      THEN DO;
            <SET LOAD$DIAMETRIC$FLAG TRUE>
            <CLEAR CALL FOR INVERSION LIMIT>
            <FIRE MASTER AND SLAVE LOADSIDE DIAMETRIC FOR A
             GIVEN TIME-T_D>
            /*ALLOW SUFFICIENT TIME TO CHARGE UP COMMUTATING
              CAPACITORS.*/
            <SET TORQUE COMMAND TO O>
            IF <TIME-T_D ELAPSED>
            THEN DO;
                  <BASED ON MOTOR VOLTS, AMPS, AND SPEED, CALCULATE
                   EXPECTED COMMUTATION DELAY IN DEGREES>
                  /* THE INTEGRATING DELAY ANGLE REGULATOR WILL BE
                     INITIALIZED TO THIS VALUE WHEN IT IS ACTIVATED ON
                     TRANSFER FROM THE IDLE TO CLOSED LOOP MODE.*/
                  <DIVIDE THIS COMMUTATION DELAY BY 30 TO DETERMINE
```

FIG.5B

EXPECTED COMMUTATION DELAY IN 30 DEG INCREMENTS>
/*SINCE THE PAIR OF THYRISTORS FIRED TO SHORT THE
   LOAD INVERTER IS KNOWN, THE PAIR OF THYRISTORS TO
   FIRE OUT OF THE DIAMETRIC IS ALSO KNOWN.
   WHILE THE DIAMETRIC IS BEING APPLIED THE
   VOLTAGE AT THE DC TERMINALS OF THE LOAD INVERTER
   IS ZERO, SO FOR A BUMPLESS TRANSFER OUT OF THE
   DIAMETRIC, THE NEW CELL TO BE FIRED SHOULD BE
   FIRED CLOSE TO ITS ALPHA OF 90 DEGREES. THIS IS
   ACCOMPLISHED BY INITIALIZING THE TORQUE COMMAND
   TO ZERO WHICH WILL AUTOMATICALLY CALL FOR ALPHA
   = 90 DEGREES. IT IS DESIRABLE TO TRANSFER FROM
   THE IDLE MODE TO THE CLOSED LOOP MODE AT ABOUT
   THE RIGHT TIME SO THAT AFTER THE FIRST PASS
   THROUGH THE CLOSED LOOP ANGLE REGULATOR THE
   FIRE COUNTER WILL BE LOADED WITH A REASONABLE
   VALUE. THIS IS DONE BY DOING A TABLE LOOKUP
   INDEXED ON THE DIAMETRIC PATH TO DETERMINE A
   GOOD 30 DEGREE SEGMENT NUMBER AT WHICH TO
   MAKE THE TRANSISTION FROM IDLE TO CLOSED LOOP
   MODE. THIS SEGMENT NUMBER IS CORRECTED FOR BY
   THE EXPECTED COMMUTATION DELAY AS EXPRESSED IN
   30 DEGREE SEGMENTS. THE CONTROL LOOPS IN IDLE
   MODE, MAINTAINING THE DIAMETRIC UNTIL THIS
   CORRECTED SEGMENT NUMBER COMES UP, THEN
   CONTROL TRANSISTIONS TO THE CLOSED LOOP MODE.*/
IF <30° SEGMENT NUMBER = CORRECTED SEGMENT TO
      MAKE TRANSISTION TO CLOSED LOOP MODE>
   THEN DO;
        OPEN$CLOSE$FLAG =TRUE;
        <INITIALIZE PH VALUE>
        <CALL FOR LOAD ANGLE REGULATOR CALCULATION>
        <INITIALIZE DELAY ANGLE REGULATOR>
        <SWITCH TO CLOSED LOOP MODE>
        <ENABLE ALL LOAD SIDE INTERRUPTS>
   END;
  END;
 END;
END;
IF LOCAL$READY = TRUE
THE <INFORM SOURCE CONVERTER CONTROL LOAD SIDE IS READY FOR
      CURRENT>;
/*THIS COMPLETES IDLE MODE.*/

FIG.5C

```
IF OPEN$CLOSE$FLAG = TRUE   /* IMPLIES GO-AHEAD TO TRANSISTION TO
                               CLOSED LOOP MODE. */
THEN DO;
    IF <PHASE LOCK LOOP IN TOLERANCE - (S$FLAG = FALSE)>
    THEN DO;
        <INITIALIZE FLUX FEEDBACK SIGNAL>
        <INITIALIZE TORQUE COMMAND TO STARTUP VALUE >
        <BASED ON MOTOR AMPS, VOLTS, SPEED INITIALIZE DELAY ANGLE
          REGULATOR>
        <INITIALIZE SPEED REGULATOR>
        <ENABLE ALL LOAD SIDE INTERRUPTS >
        <SWITCH TO CLOSED LOOP MODE >
    END;
END;
IF <FIRST PASS THROUGH OPEN LOOP MODE>
THEN IF IN RAMP DOWN MODE DO;
    <INITIALIZE CURRENT COMMAND >
    <INITIALIZE OPEN LOOP STARTUP FREQUENCY TO 60 HZ>
    /* FREQUENCY WILL RAMP DOWN FROM THIS VALUE UNTIL PEAK FLUX
       IS FOUND OR UNTIL MINIMUM FREQUENCY */
    < SET SECOND$PASS$FLAG TRUE >
END;
ELSE IF IN RAMP UP MODE
THEN DO;
    <INITIALIZE CURRENT COMMAND>
    <INITIALIZE OPEN LOOP STARTUP FREQUENCY TO MIN. FREQ.>
    <SET SECOND$PASS$FLAG TRUE>
END;
IF SECOND$PASS$FLAG = TRUE
THEN DO;
    <LOAD OPEN LOOP FREQUENCY COMMAND INTO PHASE LOCK LOOP
      COUNTER>
    <RAMP UP CURRENT UNTIL REFERENCE VALUE FOR OPEN LOOP IS
      REACHED AND THEN SET SECOND$PASS$FLAG FALSE >
END;
```

FIG.6A

```
ELSE IF IN RAMP DOWN MODE DO;
    IF FLUX$FB > LIMIT$1 AND > FLUX$PEAK
    THEN DO;
        FLUX$PEAK = FLUX$FB;
        FLUX$DROOP = .875 * FLUX$PEAK;
    END;  /* SEARCHING FOR PEAK FLUX. */
    IF (FLUX$FB < FLUX$DROOP) OR ((FLUX$FB > LIMIT$2) AND
                                    FREQUENCY > LIMIT$3)
    /* HAVE EITHER PASSED THE PEAK OR THE FLUX AND FREQUENCY
        ARE HIGH ENOUGH TO MAKE A TRANSISTION TO CLOSED LOOP */
    THEN OPEN$CLOSE$FLAG = TRUE;
    ELSE DO;
        IF <FREQUENCY STILL ABOVE MIN. OPEN LOOP FREQ.>
            THEN <CONTINUE TO RAMP DOWN FREQUENCY>
            ELSE DO;
                < SWITCH TO RAMP UP FREQ. MODE >
                SECOND$PASS$FLAG = TRUE;
                <INITIALIZE FREQ. AND CURRENT FOR RAMP UP MODE>
                /* TERMINATE LOW CURRENT SCAN FOR PEAK; RAMP UP
                    CURRENT FOR LOW FREQ. STARTUP */
            END;
    END;
END;
ELSE IF IN RAMP UP MODE
THEN DO;
    IF FLUX$FB HIGH ENOUGH /* IF NOT WAIT FOR MOTOR TO COME UP
                                TO SPEED AND BUILD UP FLUX. */
    THEN DO;
        IF FREQ. > OPEN TO CLOSE LOOP TRANSISTION FREQ.
        THEN OPEN$CLOSE$FLAG = TRUE; /* GO TO CLOSED LOOP. */
        ELSE <CONTINUE TO RAMP UP FREQUENCY>
    END;
END;
IF OPEN$CLOSE$FLAG = TRUE
THEN DO;
```

FIG. 6B

```
<INITIALIZE PHASE LOCK LOOP HARDWARE FOR CLOSED LOOP>
<ENABLE INTERRUPTS FOR PHASE LOCK LOOP PROGRAMS>
END;
/* THE CLOSED LOOP PHASE LOCK LOOP IS NOW RUNNING. HOWEVER
   CONTINUE TO LOOP IN THIS PROGRAM UNTIL THE CHECK AT ITS
   BEGINNING SHOWS THE PHASE LOCK LOOP IS IN TOLERANCE. THEN THE
   SWITCH TO CLOSED LOOP IS MADE AND THE SPEED REGULATOR
   INTERRUPT IS ENABLED. */
```

FIG. 6C

START-UP CONTROL FOR AN INDUCTION MOTOR DRIVE

REFERENCED MATERIAL

Reference is made to a microfiche appendix which sets forth a computer program listing of the software modules which have been added to or modified in the program listing provided in the microfiche appendix of D. Lippitt et al U.S. Pat. No. 4,449,087 and the program listing provided in the microfiche appendix of Espelage's allowed U.S. patent application Ser. No. 626,999. Included with this application is one microfiche containing a total of 14 frames. U.S. Pat. No. 4,449,087 is assigned to the same assignee as the instant application and is hereby incorporated by reference.

CROSS REFERENCE TO RELATED APPLICATIONS

This application is related to copending application Ser. No. 626,999 and Ser. No. 626,982 filed on even date herewith and assigned to the instant assignee.

BACKGROUND OF THE INVENTION

The present invention relates to a start-up control for AC motors and more particularly a start-up control for induction motors without tachometer feedback and with arbitrary initial speed.

On initial start-up, and induction motor used in an industrial application can have any speed of rotation within the normal operating range. This could be caused by a previous intentional or inadvertent shutdown. Many induction motors supplied by current controlled or voltage controlled DC to AC inverters do not have tachometer feedback of the rotor speed. Tachometers are high maintenance devices and the motor and drive can be made more rugged and reliable if tachometer feedback is not used. If during an intentional or inadvertent shutdown, motor flux has been lost, it can take a large inertia motor and load minutes to slowly coast to zero speed. If an attempt is made to start the motor while it is rotating without knowing the motor speed, an abrupt change of motor speed could result causing damage to the motor and load.

It is an object of the present invention to provide open loop starting for an induction motor drive rotating at any initial speed.

It is a further object of the present invention to provide open loop starting for an induction motor drive rotating at any initial speed resulting in a smooth transition to closed loop motor operation.

SUMMARY OF THE INVENTION

In one aspect of the present invention a method of starting an AC motor from any initial speed using open loop control is provided. First, sufficient current is provided to the motor so that motor flux can be developed. The frequency provided to the AC motor is then varied and the stator frequency at which the motor peak flux occurs is determined. A transition to a control responsive to an external command at approximately the stator frequency at which the peak flux occurred can then be made.

BRIEF DESCRIPTION OF THE DRAWING

The features of the invention believed to be novel are set forth with particularity in the appended claims. The invention itself, both as to organization and method of operation, together with further objects and advantages thereof, may best be understood by reference to the following description taken in conjunction with the accompanying drawing in which:

FIGS. 5A,B&C constitute a pseudo code listing of idle mode software for implementing the start-up control in accordance with the present invention;

FIGS. 6A,B&C constitute a psuedo code listing of open loop mode software for implementing the start-up control in accordance with the present invention.

DETAILED DESCRIPTION OF THE INVENTION

Figure 1B:
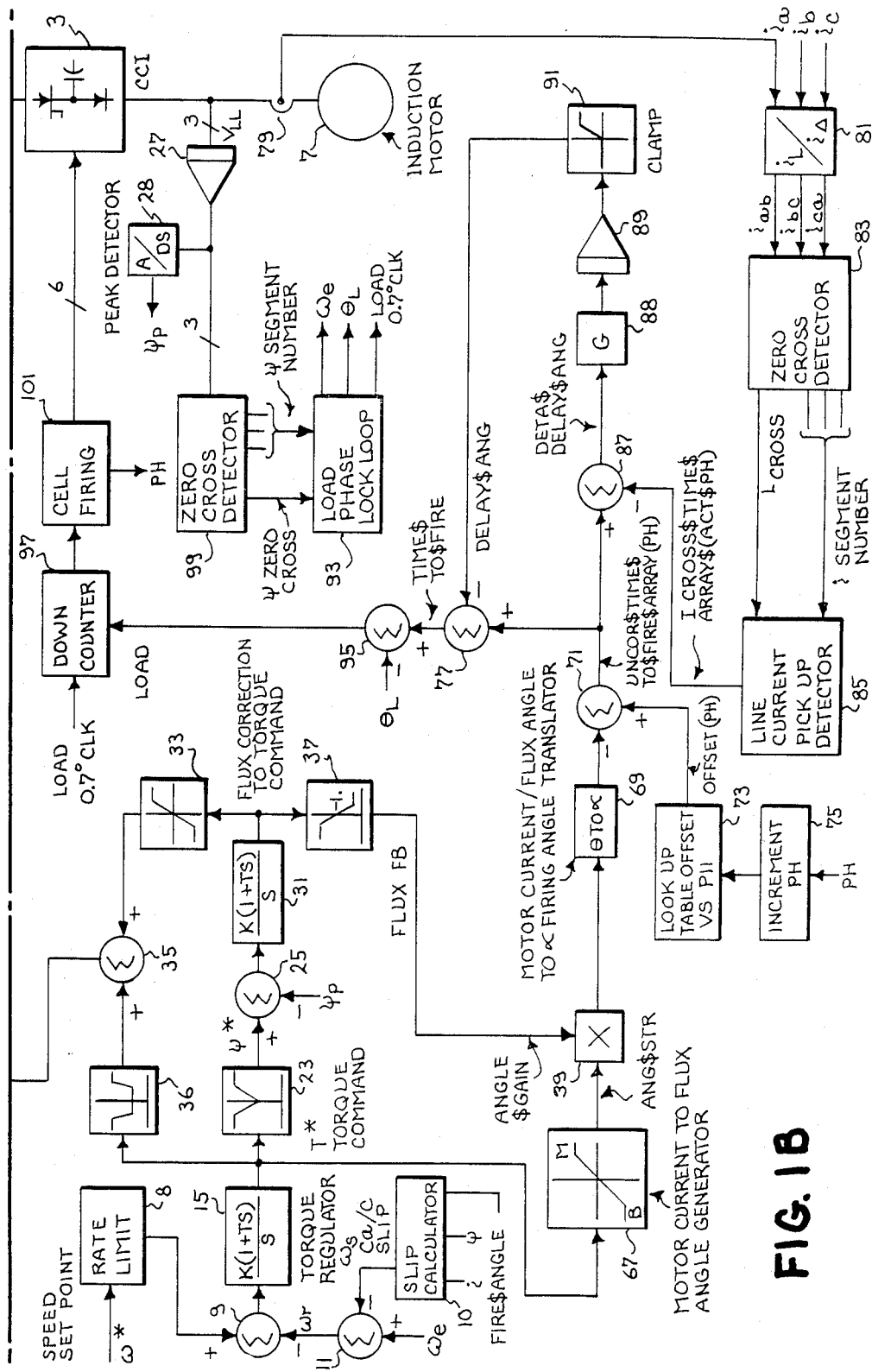
FIGS. 1A&B constitute a major block diagram representation of a drive system incorporating the present invention.

Referring now to the drawing and particularly FIG. 1 thereof, an induction motor drive system including a source side converter comprising a phase controlled rectifier 1, is coupled to an external 3 phase power source. The source side converter provides variable magnitude direct current to a load side converter comprising a current controlled autosequentially commutated inverter 3 through a DC-link reactor 5. The inverter operates to provide variable magnitude, variable frequency AC current to a 3 phase induction motor 7.

A commanded speed $\omega^*$ is an input signal to the AC motor drive control and is supplied to a rate limiting block 8 and the output of the rate limiting block is compared to a speed reference signal $\omega_r$ in summer 9. The speed reference signal $\omega_r$ could be developed by calculating the slip in a slip calculator 10 from motor current, flux and firing angle, and subtracting the slip in summing junction 11 from the frequency $\omega_e$ of the power supplied to the induction machine 7. The error signal from summing junction 9 is supplied to a speed regulator circuit 15 having a transfer function of $k(1+TS)/S$ where S is the LaPlace operator. The output of the speed regulator block is a torque command $T^*$. The torque command is fed to three control paths. An upper path controls the current in the phase controlled rectifier 1.

A center control path controls flux in the induction motor 7 by controlling the firing of the switching devices in inverter 3. The center path provides flux correction to the torque command $T^*$ provided to the upper and lower paths. Function block 23 converts the torque reference signal $T^*$ to a flux command $\Psi^*$. The function implemented in function block 23 provides an offset to assure a fixed level of flux at zero torque. The flux command is compared in summing junction 25 to a flux signal $\Psi_p$, determined by integrating motor line voltages in integrator 27 and passing the signal through a peak detector 28, to form a flux feedback signal which is fed through a gain block 31 to a limiter 33. The output of the limiter is supplied to a summing junction 35 along with the magnitude of the torque command T* from function block 36. The output from limiter 33 adjusts the current command when the flux is different from the commanded value, to convert the upper current control path to a flux regulator when torque and commanded torque are both near zero.

The flux error signal from gain block 31 is also supplied to an offset function in block 37. The output signal block 37 is coupled to a multiplier 39 in the lower control path. Offset function 37 generates an output of unity when the flux error signal is zero. The output of the offset function 37 decreases below unity when the commanded flux is greater than the actual flux to decrease the angle between motor current and flux to divert more of the available current into the flux producing axis.

The flux corrected torque signal from summing junction 35 is supplied to a function block 41 which provides a current command I* which is compared to a current feedback signal $I_{FB}$ in summing junction 43. The current feedback signal is obtained from current sensors 45 in each of the three lines supplying the phase controlled rectifier 1. Absolute value block 47 receives the three sensed line currents and provides the current feedback signal $I_{FB}$ indicative of the magnitude of the three signals.

Current regulator 49, which can be a proportional plus integral regulator, in response to the current error from summing junction 45, provides a voltage command signal V*. A voltage to firing angle translator 51, which can be implemented as a look-up table, provides a firing angle command $\alpha$* in response to the voltage command V*.

The firing circuit, including the phase-locked loop integrator, zero crossing detector, cell firing block and down counter for the phase controlled thyristor bridge is the same as set forth in Lippitt et al. U.S. Pat. No. 4,449,087. The three phase line to line voltages supplied to the phase controlled thyristor bridge are integrated in integrator 53 and the zero crossings of the integrated voltages are determined in block 55 and used to form a synchronizing pulse train to the phase-locked loop 57 having a frequency of 6 times the source fundamental frequency $\omega_S$. A preferred form of apparatus utilizable for implementing the integration of the line to line voltages comprises circuitry shown and described in U.S. Pat. No. 4,399,395 issued Aug. 16, 1983 entitled "Line-to-Line Voltage Reconstruction for Synchronizing Thyristor Power Converter" which is hereby incorporated by reference. Such circuitry operates to reconstruct the line to line voltage waveforms which become corrupted by the commutation notches appearing in the waveforms of the phase voltages during the time each phase current transfers from an outgoing phase to an oncoming phase by the appropriate firing of the individual thyristors. The line to line voltage reconstruction preferred by the subject invention consists of a composite waveform developed by summing at least one integrated line to line voltage containing commutation notches with a signal corresponding to at least one "delta" current which is derived from the difference of two phase currents and multiplied by a factor representative of the commutation inductance.

At the occurrence of a zero crossing signal, a time counter in the phase-locked loop 57 is read. The correct time counter reading at this instant is known, and the difference between the actual and correct values represents a phase error which passes through a software proportional plus integral regulator. The output of the regulator represents the value by which the high frequency clock to the phase-locked loop counter is divided so as to provide a clock frequency from the phase-locked loop counter of 512 times the fundamental frequency of the line to line voltage supplied the phase controlled thyristor bridge 1. The frequency of 512 times the fundamental frequency provides an angle resolution of 0.703° of fundamental frequency and serves as the clock frequency to the down counter 59. The commanded firing angle $\alpha$* is added to a cell offset from a look-up table 61. The table look-up provides one of six offsets based on the variable PH which is indicative of the next cell pair to be fired. The variable PH is incremented each time a cell is fired.

The term cell is used in this application to refer to the controllable switches in the converters, namely, thyristors. The variable PH which can take on the values of one through six inclusive is indicative of which cell pair which is to be fired next as, shown in the table below.

| PH | ON CELLS |
|---|---|
| 1 | 6 and 1 |
| 2 | 1 and 2 |
| 3 | 2 and 3 |
| 4 | 3 and 4 |
| 5 | 4 and 5 |
| 6 | 5 and 6 |

The cells in the bridge of the converters 1 and 3 are numbered, as shown below, in the order in which they are fired

| 1 | 3 | 5 |
|---|---|---|
| 4 | 6 | 2 |

The A phase is connected between cells 1 and 4, the B phase is connected between cells 3 and 6 and the C phase is connected between cells 5 and 2. Each variable PH has a duration of 60° and each cell is fired with a high frequency pulse train 120°.

The current count of the time counter located in the source phase-locked loop 57 is subtracted from the summing junction 58 and the resultant amount loaded into down counter 59. When down counter 59 reaches zero a signal is sent to the cell firing block 65 which fires the appropriate thyristor pair in phase controlled rectifier 1 and sends a signal to increment the variable PH in block 63.

The motor current flux angle generator 67 in the lower control loop receives a torque command T* and provides a desired angle between motor current and motor flux angle. The motor current/flux angle is modified by multiplier 39 dependent on the flux error signal from gain block 31. The resulting motor current to flux angle is converted to an equivalent firing angle $\alpha$ in motor current flux angle to alpha firing angle translator 69. The firing angle $\alpha$ is added in summer 71 to an offset determined from a look up table 73 which contains six offsets, one for each variable PH value indicative of the next cell pair to be fired. The output of summer 71 is the uncorrected time to fire array, which corresponds to time in degrees to fire the next pair of load side cells in the autosequentially commutated inverter3.

In summer 77 a delay angle in degrees is subtracted from the uncorrected time to fire array to compensate for the delay in line current pick up when the thyristor it is fired due to the controlled current commutating circuit. The delay angle is determined by measuring the three line currents $i_a$, $i_b$, $i_c$ using correct sensors 79. The difference currents $i_{ab}$, $i_{bc}$, $i_{ca}$ are next determined in a line to delta transformation block 81. A zero crossing detector 83 generates a digital signal when a zero crossing of the difference currents occurs and a three bit segment number indicative of the difference current having the zero crossing. These two sets of signals from the zero crossing detector are provided to a line current pick up detector 85 which determines which thyristor firing is associated with the last zero crossing and the time of the current pick up. The difference between the actual current zero crossing and the intended zero crossing is determined in summer 87 and the resulting error angle is input through a gain block 88 to an integrator 89. The output of the integrator is clamped in limiter circuit 91 with an lower and upper limit of zero and 120°, respectively. The time to fire signal from summer 77 is reduced by the current count $\theta_L$ of the phase-locked loop 93 in summer 95, to determine the time to go. The time to go is loaded into a down counter 97 which is clocked by a clock signal from the phase-locked loop 93. When the down counter 97 times out the cell firing block 101 fires the next pair of cells in inverter 3. Integrator 27, zero crossing detector 99, cell firing circuit 101 and down counter 97 operate in the same manner as the corresponding firing circuitry described in the upper control loop.

Figure 2:
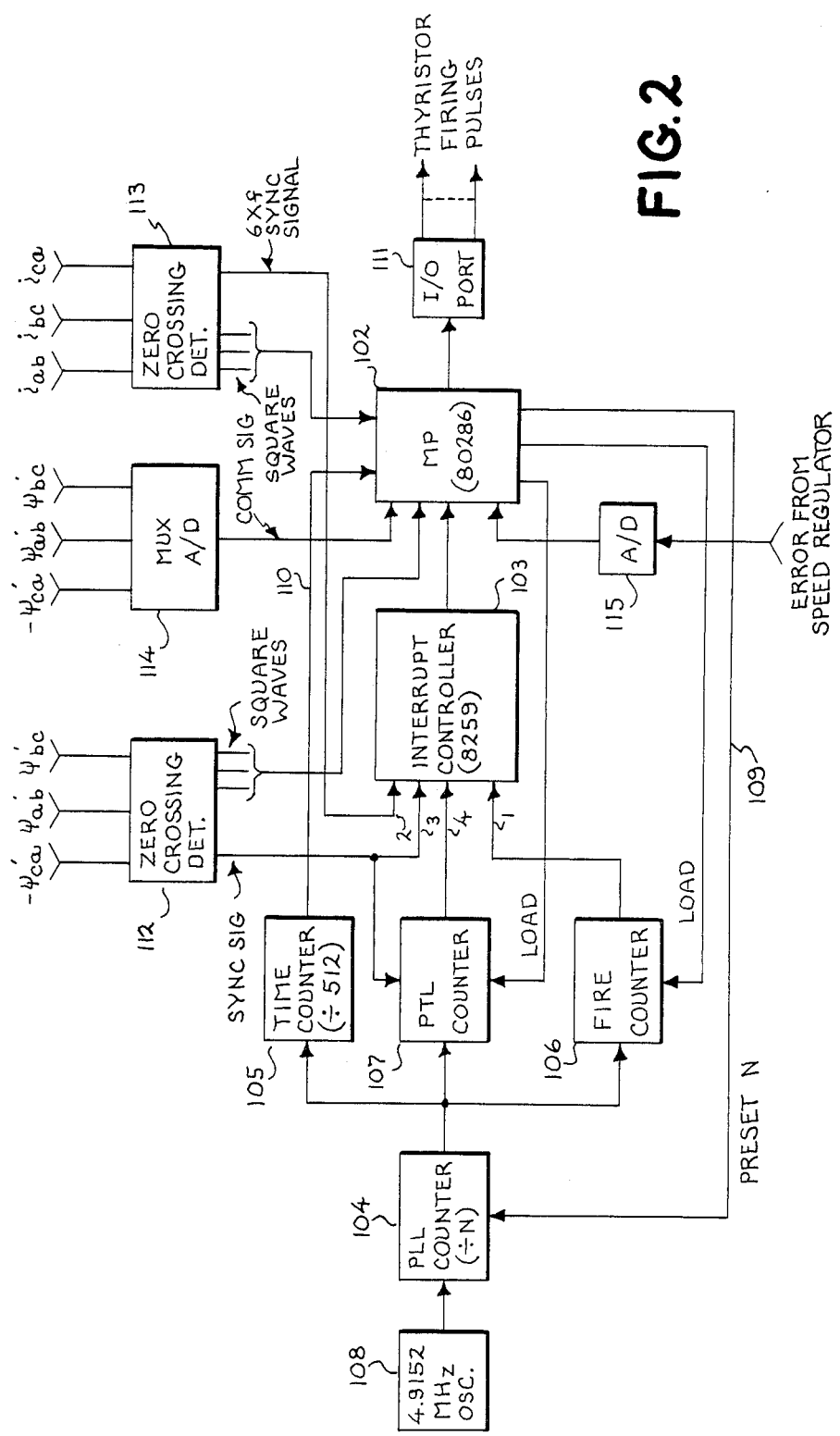
FIG. 2 is a hardware diagram of a digital embodiment of the load side converter control of the drive system of FIG. 1.

A digital implementation of the portion of the block diagram of FIG. 1 responsive to the speed error signal from summer 9 for controlling the firing of inverter 3 is shown in FIG. 2. Referring now to FIG. 2, there is shown an INTEL 80286 microprocessor 102 programmed in the PLM 86 language, having self contained interrupt programs under the control of an INTEL 8259 interrupt controller 103. The controller 103 generates interrupts in a well known fashion which causes the microprocessor 102 to execute some task or calculation and typically store the time to execute some future event into a down counter. When the down counter reaches zero, the counter generates another interrupt which initiates the event, after which the counter is reloaded for the time to execute the next event.

With respect to FIG. 2, a software phase-locked loop configuration is shown wherein four counters are utilized, namely a phase-locked loop counter 104, a time counter 105, a fire counter 106 and a pulse train limit counter 107. In operation, a variable frequency source is created by the phase-locked loop counter 104 by dividing a 4.9152 MHz output pulse train from a clock oscillator 108 by a value N set by a signal "PRESET N" from the microprocessor 102 on a data bus 109. The output of the counter 104 is adapted to be maintained at a frequency 512 times the frequency of the individual flux waves $\Psi_{ca}'$, $\Psi_{ab}'$, $\Psi_{bc}'$, in the following manner.

The time counter 105 is initially set to 512 at a given flux wave zero crossing and decremented by 1 each clock pulse from counter 104. When counter 105 is decremented to one it resets to 512. Thus counter 105 gives a measure of phase angle relative to the flux waveforms. The count value in the time counter 105 is fed to the microprocessor 102 via data bus 110 where it is used for phase reference for firing the inverter cell, not shown, through a digital I/O port 111. Synchronization is achieved by passing the pseudo flux wave forms $\Psi_{ca}'$, $\Psi_{ab}'$, $\Psi_{bc}'$ through a zero crossing detector 112 which generates a synchronizing pulse every time a flux wave passes through zero. These pulses are fed to the interrupt controller 103 which interrupts the microprocessor 102 and initiates a crossover service program. The zero crossing detector 112 also generates a three bit number indicating the relative signs of the motor flux waveforms, which number is fed to and read by the microprocessor 102 and is used to identify which zero crossing has caused the interrupt pulse. The zero crossover service program reads the value in the time counter 105 and compares it to the correct value for the particular flux wave crossing to generate a phase error between the counter 105 and the flux waves. This error is used to calculate a new "PRESET N" value which is then loaded into the phase-locked loop counter 104.

Figure 4:
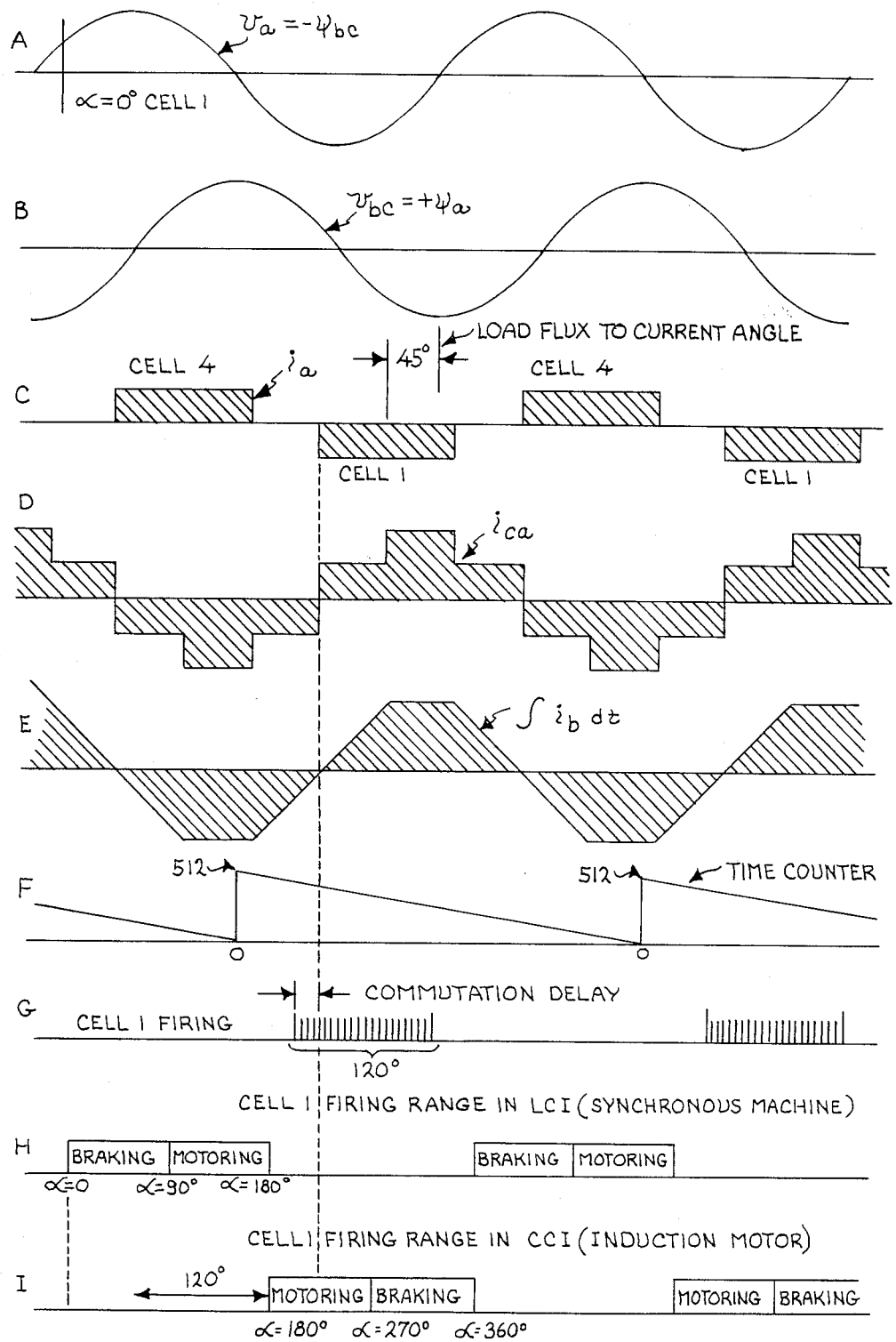
FIGS. 4A-I are waveform and firing range diagrams on a common time scale helpful in explaining the operation of the present invention.

There can be a substantial delay between the application of a firing signal to a thyristor and the time when line current starts to conduct in a controlled current inverter supplying an induction motor, especially at high motor speed and light motor load. This delay is caused by the fact that the commutating capacitors are charged such that initially the particular diode in series with thyristor being fired is reversed biased and the current doesn't pick up in that phase until the commutation capacitor has discharged through the load. To preserve the desired relationship between motor flux and current this delay has to be compensated for. The time at which the current actually picks up is measured by zero crossing detector 113 monitoring the zero crossings of the motor line difference currents to generate a synchronizing signal to the interrupt controller 103 every time a zero crossing is detected. The difference current $i_{ca}$ is shown in FIG. 4D. The zero crossing of FIG. 4D coincides with the initiation of current flow in Phase A shown in FIG. 4C. The interrupt controller interrupts microprocessor 102 and initiates a delay determination program. The zero crossing detector 113 also generates a three bit number indicating the relative signs of the motor difference currents, which number is fed to and read by microprocessor 102 and is used to identify which thyristor is associated with a zero crossing. The delay determination program compares the current crossing time and the uncorrected time to fire (based on the angle command and offset) and inputs this value through gain 88 to a software integrator to obtain the delay angle. The delay angle is clamped between zero and 120°. Also since the commutation delay is a constant time phenomenon, the need to compensate for the delay decreases as a function of speed. Therefore, since the sampling rate of the compensator occurs at six times load frequency, the gain of the regulator loop track frequency inherently stabilizes the compensator.

The time to fire is then determined as the uncorrected time to fire less the delay angle. The time to go is determined by subtracting the time counter reading from the time to fire so that when the time to go, which is measured in degrees, is loaded into the down counter and the down counter clocks down to zero count, an interrupt is generated which calls for the next cell firing.

The timing of the firing of each thyristor cell in the inverter 3 is accomplished by means of the fire counter 106. After a cell firing, the microprocessor 102 computes the time to fire the next cell. This time is the uncorrected time to fire less the delay angle. This time is compared to the value in the time counter 105 which corresponds to current time. The difference in the time to go is then loaded into the fire counter 106 via the data bus, which then decrements to zero causing yet another interrupt to the interrupt controller 103 which initiates a cell firing program.

Figure 3A:
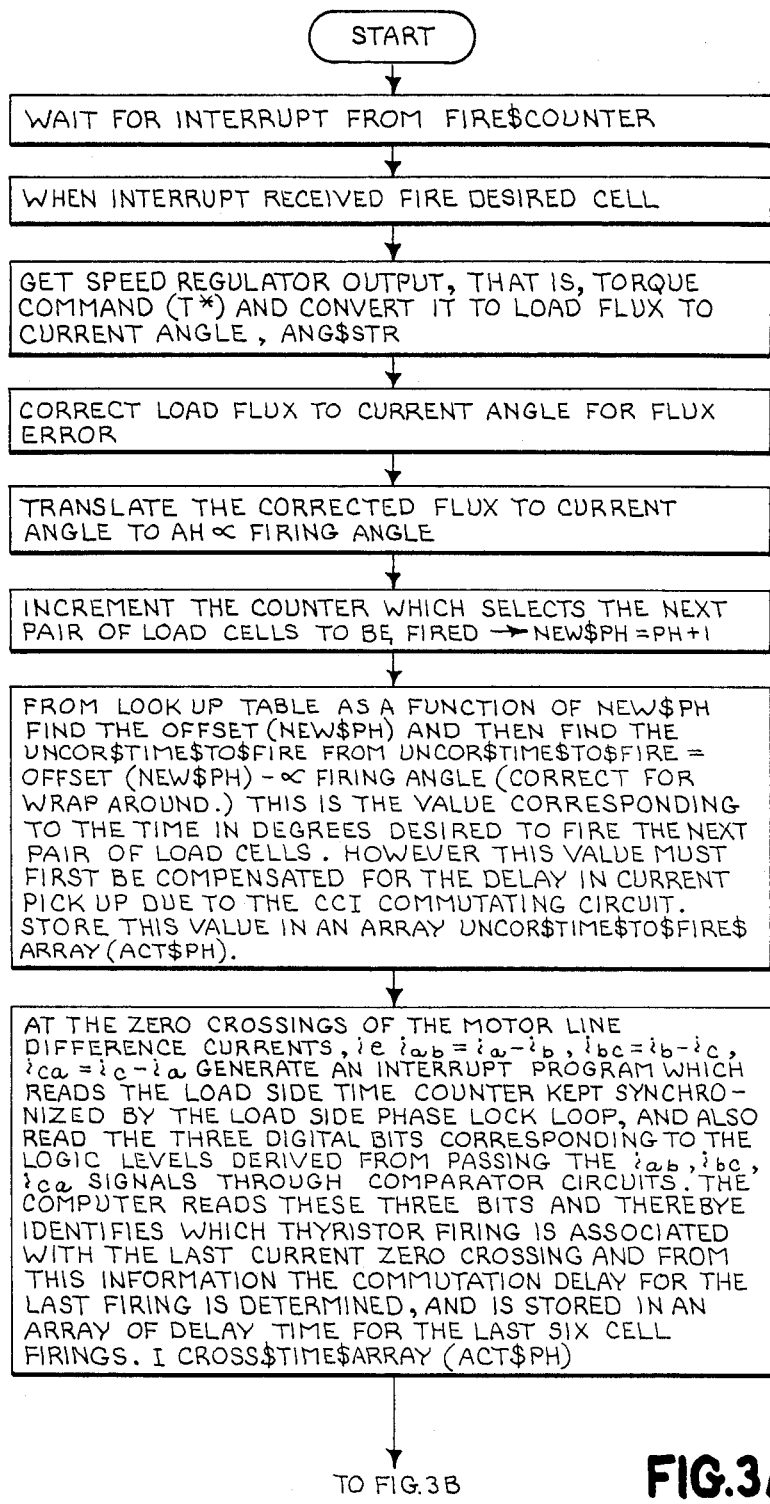
FIGS. 3A&B constitute a flow chart illustrative of the software for implementing the load side converter control with the embodiment of FIG. 2.

The software required for the embodiment illustrated in FIG. 2 is represented by the flow chart shown in FIG. 3. As shown, the routine for firing the inverter thyristors in accordance with the present invention begins by receiving an interrupt from the fire counter 106, when the fire counter is clocked down to zero. Next, the desired cell pair is fired. The output of the speed regulator (not shown) which is a torque command, is coupled to the A/D converter 115 and converted to a load flux to current angle. The angle between motor line current and phase flux is linearly related to the angle between motor phase voltage and line current, and thus also to the load converter firing angle alpha. For illustration, the difference between the phase flux of phase A shown in FIG. 4B and the phase A line current in FIG. 4A is 45°. The load flux to current angle is then corrected for flux error. The corrected flux to current angle is translated to an alpha ($\alpha$) firing angle. An $\alpha$ firing angle is defined as an angle measured with reference to a particular reference point, with a firing angle of zero corresponding to the condition when each thyristor in the circuit is fired at the instant its anode voltage first becomes positive in each cycle asssuming no commutation circuit. Under this condition the converter (assuming to commutation circuit) operates in exactly the same manner as if it were an uncontrolled rectifier circuit. The $\alpha=0$ firing angle relative to the phase a voltage is shown in FIG. 4A. It will be remembered that just one phase of a three phase system is shown.

The relationship between firing angle alpha and the direction and amount of motor power is shown in FIG. 4I for cell one of a current controlled inverter supplying an induction motor and in FIG. 4H for cell one of a load commutated inverter supplying a synchronous motor. In a synchronous motor, maximum braking power is obtained at $\alpha=0°$, zero power at $\alpha=90°$, and maximum motoring power at $\alpha=189°$, while in the induction motor, maximum motoring power is obtained at $\alpha=180°$, zero power at $\alpha=270°$, and maximum braking power at $\alpha=360°$.

The counter which selects the next pair of load cells to be fired is incremented so that the variable NEW$PH equals PH+1. From a look-up table a variable OFFSET (NEW$PH) corresponding to the current value of the variable NEW$PH is determined and the variable UNCOR$TIME$TO$FIRE is determined from the difference between OFFSET (NEW$PH) and the $\alpha$ firing angle. The UNCOR$TIME$TO$FIRE is the time in degrees to fire the next pair of load side cells. Since the UNCOR$TIME$TO$FIRE has to be compensated for the delay in current pickup due to the CCI commutating circuit, this value is stored in an array UNCOR$TIME$TO$FIRE$ARRAY (ACT$PH).

At the occurrence of the zero crossings of the motor line difference currents an interrupt program in generated which reads the load side time counter which is kept synchronized by the load side phase-locked loop, and also reads the 3 digital bits corresponding to the logic levels derived from passing the 3 difference currents through comparator circuits. The 3 bit segment numbers are read to identify which thyristor firing is associated with the last current zero crossing, and from this information the commutation delay for the last firing is determined and stored in an array of the delay time for the last six cell firings. ICROSS$TIME$ARRAY (ACT$PH). An alternative to using the zero crossings of the difference currents is to use the integral of the line current. As shown in FIG. 4E the zero crossing of the integral of the line current $i_b$ detects the pickup of the current in thyristor 1 and thyristor 4 (not shown). Similarly, the integral of the line current $i_a$ gives the zero crossing of cells 2 and 5. Using the difference currents gives the best dynamic response. Using the integrated line currents gives better filtering to guard against ambiguous zero crossings if the minimum current settings are not properly coordinated with the dc link reactor and current ripple causes discontinuous current operation. In the present embodiment the difference currents were used after they were passed through a low pass filter.

The difference between the actual zero crossing and the intended zero crossing is determined by the ICROSS$TIME$ARRAY (ACT$ PH) less the UNCOR$TIME$TO$FIRE$ ARRAY (ACT$ PH) corrected for numeric wraparound and called DELTA$DELAY$ANGLE. The value of DELTA$DELAY$ANGLE is applied, via gain 88, as an input to a software integrator to obtain DELAY$ANG-=DELAY$ANG+DELTA$DELAY$NAG. The value of the DELAY$ANG is clamped between zero and 120°. The commutation delay is illustrated in FIG. 4G where the cell 1 firing was initiated using a high frequency pulse train gating of 15 microseconds on 30 microseconds off, but current conduction in phase A was delayed. The cell firing pulse train (FIG. 4G) is seen to have duration of 120°. The firing ranges shown in FIG. 4H and I show the permissible initiation times of the current transfer not their duration. As seen in FIG. 4I the pulse train can be initiated up to 120° befoe the permissible firing range, if necessary, to cause the current pick up to occur at $\alpha=180°$.

The TIME$TO$FIRE is calculated as TIME$TO$FIRE=UNCOR$TIME$TO$FIRE-DELAY$ANGLE. The TIME$TO$GO is then calculated as TIME$TO$GO$=TIME$TO$FIRE-TIME$COUNTER$HEADING. The TIME$TO$GO is the value in degrees to be loaded into a down counter, such that when the down counter clocks down to zero count, an interrupt is generated which calls for the next cell firing. The TIME$TO$GO is corrected for numeric wraparound since the allowable value of the time counter is zero to 512 counts.

If the TIME$TO$GO is negative, this means that it is already too late to fire and the next thyristor pair is fired immediately. If the TIME$TO$GO is too short to allow another regulator calculation, the fire counter is loaded with the TIME$TO$GO and the fire counter preset is loaded with the equivalent of 60° of count. By this means the next thyristor pair is fired after the TIME$TO$GO count is decremented in the fire counter and then the 60° of count is then loaded into the fire counter such that if the next regulator calculation is not completed within 60°, the time for firing the next thyristor pair defaults to 60° after the last firing.

If the TIME$TO$GO calculated above is long enough to run another regulator calculation, then the fire counter is loaded with some count NEXT$TIME, and the fire counter preset is loaded with TIME$TO$GO-NEXT$TIME. By this means after NEXT$TIME decrements to zero another regulator calculation is made to determine a new TIME$TO$GO. If however this new calculation is not ready, the time for firing the next thyristor pair defaults to TIME$TO$GO-NEX- T$TIME. The routine then waits for another interrupt from the FIRE$COUNTER.

In order to more fully understand the operation of the microprocessor 102 as it relates to control of the load side inverter 3, the interrupt programs of this microprocessor will be briefly considered. Athough some redundancy will result in view of the proceeding description, in their descending order of priority, the programs consist of: (1) the fire counter service program, (2) the difference current crossover service program, (3) the flux crossover service program, (4) the pulse train limit service program, (5) the phase-locked loop correction program, (6) the inverter control program, and (7) the speed regulator program.

The fire counter service interrupt program is initiated every time the fire counter 106 times out. The fire counter service interrupt program sets up the next fire counter load output from the microprocessor for a count of 60° so that barring later information, the next fire counter service interrupt will occur at 60°. The fire counter service interrupt program then checks to see if the new cell firing is to occur during this pass through the program; if so, the cell firing algorithm is called. Then the fire counter service interrupt generates an interrupt to initiate the inverter control interrupt program which is at a lower level of priority.

The second highest priority interrupt program is a difference current crossover service program which as previously noted is generated at every zero crossing of the difference currents to identify when current in the appropriate phase has picked up by reading time counter 105. To properly identify which current zero crossing has occurred, the polarity of all 3 phases of the difference currents is detected at the same time the zero crossing occurs. And from this information the proper identification can be made, even for communtation delays up to 120° which is the inherent maximum allowable delay in a controlled current inverter from a stability viewpoint.

The third highest priority interrupt program is the flux crossover interrupt which as previously noted is generated at every zero crossing of the reconstructed flux waves that occur six times per cycle of fundamental frequency and from which are generated the synchronizing signals for the software phase-locked loop shown in FIG. 2. The crossover interrupt program, moreover, reads the time counter 105 which is clocked from the phase-locked loop counter 104. As already indicated, the clock rate is 512 pulses for fundamental frequency. Thus the fundamental frequency period is divided by 512 giving the time counter an angle resolution of 360° divided by 512, which is equal to 0.703° of fundamental frequency. The flux crossover program also reads the pulse train limit counter which started counting down from a count equivalent to 30°, when the zero crossing interrupt was generated. This enables a correction of the time counter reading by the amount of the time that the higher priority fire service interrupt program may have held off the flux crossover interrupt program. The flux crossover program then generates an interrupt calling for the phase-locked loop correction interrupt program. The phase-locked loop correction program determines the angular error between the synchronizing crossover interrupt pulses outputted from the zero crossing detector 112 and the actual corrected time counter reading from counter 105 whereupon a new $\div N$ is loaded into the PLL counter 104 and which operates to nullify this error.

Next the pulse train limit service program, which is fourth in priority, occurs when the pulse train limit counter 107 decrements to zero. The pulse train limit interrupt occurs 30° of fundamental frequency after a flux wave zero crossing. The primary purpose of the pulse train limit interrupt program is to read peak flux which occurs 30° after a flux wave zero crossing. The pulse train limit counter is reloaded with 30° of fundamental frequency count after time out, but the counter doesn't initiate countdown until the occurrence of the next flux wave zero crossover.

The fifth highest priority interrupt program is the phase-locked loop correction interrupt program and is called once for each flux crossover interrupt program. A phase-locked loop correction interrupt program calculates the value of the divider ($\div N$) phase-locked loop counter 104 to maintain synchronism between the pulse output of the counter and the zero crossing of the flux waves.

The load side inverter control interrupt program is next lower in priority and contains the bulk of the mode determination, regulates thyristor firing angle determination functions and accordingly calls the appropriate algorithms. While the inverter control interrupt program is low in priority, it is called by the highest priority fire service interrupt program. The lowest priority program is the speed regulator interrupt program which is called by software in the inverter control interrupt program.

The software routine set forth in FIG. 3 describes the closed loop operation of the six pulse inverters in the induction motor control. There are three control modes for the load inverter, idle, open loop and closed loop. There are two modes of control for the source inverters, idle and active. When the control is on, but the drive is commanded off (zero speed), the control for both the source and load will be in the idle mode (not firing thyristors in the source or load converters). The operation of the load side converter during idle mode and the open loop mode will be described hereinbelow in connection with the motor start-up procedure from any speed.

Referring now to FIG. 5 a pseudo code listing of software for the load side converter idle mode to bve used with the digital hardware of FIG. 2 is shown. Pseudo code or as it is sometimes called pseudo language is a design language which provides a means for representing data and processing in a textual format. A design language has formal syntax but incorporates free form English language descriptions to explain detail. Although a design language is not directly executable, automated techniques for design evaluation and even conversion to code are possible.

In the pseudo code shown in the Figures in the present application comments are preceded by the symbols /* and followed by the symbols */. Program functions described in English begin with the symbol < and end with the symbol >.

Broadly speaking the idle mode checks for the presence of motor flux which might be found after a brief inadvertent shutdown. If flux is present the phase-locked loop can be synchronized to the flux crossing and a transition can be made to closed loop control. If no flux is found, which would occur at motor stand still, or with motor rotation but no current being provided by the source converter, then two thyristors coupled to a motor phase are fired simultaneously to charge commutating capacitors enabling load current to be commutated on a subsequent firing. The source converter is informed to provide current. When the capacitors have received sufficient charge to allow commutation, a transition is made to the open loop mode.

Referring now to FIG. 5, on the first pass through the idle mode program a call for the inversion limit of the load converter thyristors to provide zero current to the motor is made. The gating of the load converter thyristors is stopped. An idle mode interrupt frequency is set so that the idle mode is called every four milliseconds. After the first run through of the idle mode program other background programs are run and the idle program is called every four milliseconds. Various variables in the idle mode program are initiated. A FLUX$DELAY$COUNTER is reset to 256. The purpose of the FLUX$DELAY$COUNTER is to allow any switching transients on the flux waves to settle out before enabling closed loop control. This completes the items handled in the first pass through the idle mode program.

A variable LOCAL$READY is set false. Assuming for now there is no flux, then all the other interrupt programs such as the fire counter service program, the difference current crossover program, the flux crossover program, the pulse train limit service program and the inverter control program are stopped. allow source to build up current to allow source to build up current. The FLUX$DELAY$COUNTER is set equal to 256.

If the drive is commanded to run then the variable LOAD$DIAMETRIC$FLAG is set true. The call for the inversion limit is cleared. A load converter diametric is fired and on subsequent passes through the program the length of time the diametric has been fired is checked to see if a predetermined time has been reached. A converter diametric comprises two series coupled thyristors connected to a single phase of the motor. When the diametric is fired, a short circuit is created allowing current to flow in the DC link (if the source converter is providing current) charging a commutating capacitor enabling load current to be commutated on a subsequent firing of the cell pair by the charged capacitor.

Assuming that the diametric has been on for a sufficient time to charge the commutating capacitors preparation is made to exit the idle mode and enter the open loop mode. The idle mode flag FIRST$PASS$FLAG is reset true, so that the idle program will be properly initialized when it is called again. If there is no motor flux, call is made for the open loop mode. The variable PH is set so that the correct thyristor pair will be fired to take advantage of the commutating capacitors charged by the diametric firing. The current command is set to minimum current limit. The flag OPEN$CLOSE$FLAG is set false. The flag OPEN$CLOSED$FLAG is set true to transition to the closed loop mode of control and is set false for transition to the open loop mode of control. The idle mode description for the situation where flux is not present is now complete. The open loop mode will be discussed hereinafter.

If in the idle mode and there is still flux in the motor while still in the idle mode, the FLUX$DELAY$COUNTER is decremented by one each pass through the idle mode. Assuming there is still flux in the motor and the FLUX$DELAY$COUNTER has been decremented to zero, the interrupts allowing the phase-locked loop to run are enabled so that the phase-locked loop can lock onto the synchronizing pulses generated by the zero crossings of the flux waves and the S$FLAG is set true. When the phase-locked loop error falls within a predetermined tolerance the flag S$FLAG is set false by the phase-locked loop regulator. When the S$FLAG is set false, the flag LOCAL$READY is set true.

If the drive is being commanded to run, then the flag LOAD$DIAMETRIC$FLAG is set true. The load side converter is fired to charge up the commutating capacitors. If a twelve pulse system is being started, a diametric in the master and the slave load side converters are fired. The source converter is informed that the load side converter is ready for current. This completes this pass through the idle mode.

On a subsequent pass if sufficient time has gone by for the commutation capacitors to be charged, an expected commutation delay in degrees is calculated, based on motor voltage, current and speed to provide an initial value when control is transferred to the closed loop mode. The commutation circuit delay calculation is used to compensate the firing angle for the expected delay beween the time a thyristor is fired and the time line current begins. If the commutation delays are not taken into account line current will not occur at the commanded firing angle. The calculated commutation delay is then divided by 30 to determine the commutation delay in 30° increments. The pair of thyristors fired to short the load inverter is known and thus the pair of thyristors to fire out of the diametric to take advantage of the charged commutating capacitors is also known. While the diametric is being applied, the voltage at the DC terminals is zero with the current drawn being controlled by the phase controlled rectifier. To provide a smooth transfer when the next cell pair is fired, the torque command has previously been set to zero which will call for a firing angle of alpha=90°.

It is desirable to transfer from the idle mode to the closed loop mode at a time such that when the first pass through the closed loop angle regulator occurs the fire counter will be loaded with a reasonable value. What is meant by a reasonable value is that the value to be loaded into the firing counter after having been compared to the time counter won't be found to be negative, which would result in the cell pair being fired immediately since the time to fire for that period to achieve that firing angle (taking into account commutation delay) will have passed. Also, it is desirable to avoid wraparound in the value to be loaded into the counter. To obtain a reasonable value to load into the fire counter a 30° time period determined from a look-up table indexed by the diametric path fired is used. The 30° time period from the look-up table is corrected by the calculated delay. The 30° period is identified by a 60° flux wave segment number corrected to 30° by the pulse train limit counter program. The 30° time period selected to transfer control to the closed loop allows the closed loop mode sufficient time to perform the calculations to determine the firing angle and arrive at a firing time that has not yet passed. When the selected 30° time period occurs a flag OPEN$CLOSE$FLAG is set true, the proper PH value is initialized. A load angle regulator calculation is called for as well as the initialization of the delay angle regulator. A switch then occurs to the closed loop mode and all the load side interrupts are enabled.

Referring now to FIG. 6, the open loop mode program checks if the flag OPEN$CLOSE$FLAG is true. Assuming for now that the flag is false and that this is the first pass through the open loop mode program and further assuming that program is in a ramp down mode a current command and an open loop start-up frequency are initialized. The start-up frequency is initialized to the maximum motor frequency which in the present embodiment is 60 Hz. A SECOND$PASS$FLAG is set true.

If the SECOND$PASS$FLAG is set true then the phase-locked loop counter is loaded with the open loop frequency command (60 Hz). The current is ramped up until an open loop reference value is reached. The open loop current reference value is a low value sufficient to develop an adequate peak flux wave amplitude when the motor is excited at an open loop frequency.

On subsequent passes through the open loop program, which occurs every time a cell pair is fired, assuming the SECOND$PASS$FLAG is true, the reference value is again checked and if the open loop reference value is reached, SECOND$PASS$FLAG is set false. On subsequent passes through the program the inverter firing frequency is ramped down. Also the variable FLUX$FB is checked to see that it is greater than a variable LIMIT$1 to assure the flux feedback is above a minimum value which exceeds the noise level. The flux feedback is further compared to the previous feedback flux and if the feedback flux is greater than a minimum value and greater than the previous feedback flux, the variable FLUX$PEAK is set equal to the variable FLUX$FB. A variable FLUX$DROOP is set equal to 0.875 of the variable, FLUX$PEAK.

Next, a check is made to see if the peak flux has been passed by comparing the variable FLUX$FB to FLUX$DROOP and seeing if FLUX$DROOP is greater. A check is also made to see if FLUX$FB is greater than a predetermined value and the frequency above a predetermined value. If either the flux peak has been past or a preset flux level is exceeded, and frequency is greater than some minimum limit, then the flag OPEN$CLOSE$FLAG is set true, signifying a transition to closed loop operation can be made.

However, if the flux peak has not been passed or the flux and frequency are not great enough to transition to closed loop control, the open loop frequency is checked to see that it is still above a minimum value and the frequency is further lowered.

When a peak flux frequency has not been found and the frequency has been ramped down below the minimum open loop frequency, a switch to the ramp up frequency mode occurs. The flag SECOND$PASS$FLAG is set true. A current command is initialized to a higher value for a low frequency start. The open loop start-up frequency is set to a minimum frequency. When the low frequency start up current is reached, the SECOND$PASS$FLAG is set false.

The flux feedback is checked to see if it is high enough to start ramping frequency up. If it is not, the open loop frequency is held constant. When the flux is great enough, signifying the motor has begun rotation, the frequency is ramped up. When the speed is high enough, the flag OPEN$CLOSE$FLAG is set true and phase-locked loop is initiated.

If the OPEN$CLOSE$FLAG is set true, then the flag S$FLAG is checked to see if it is false signifying that the phase lock loop is in tolerance. When the flag S$FLAG becomes false, the control is initialized to allow transition to the closed loop mode. The torque command is initialized to its start up value. Based on the motor current, voltage and speed the delay angle regulator is initialized. The speed regulator is initialized and all the load side interrupts are enabled. The control then switches to closed loop control.

Figure 7:
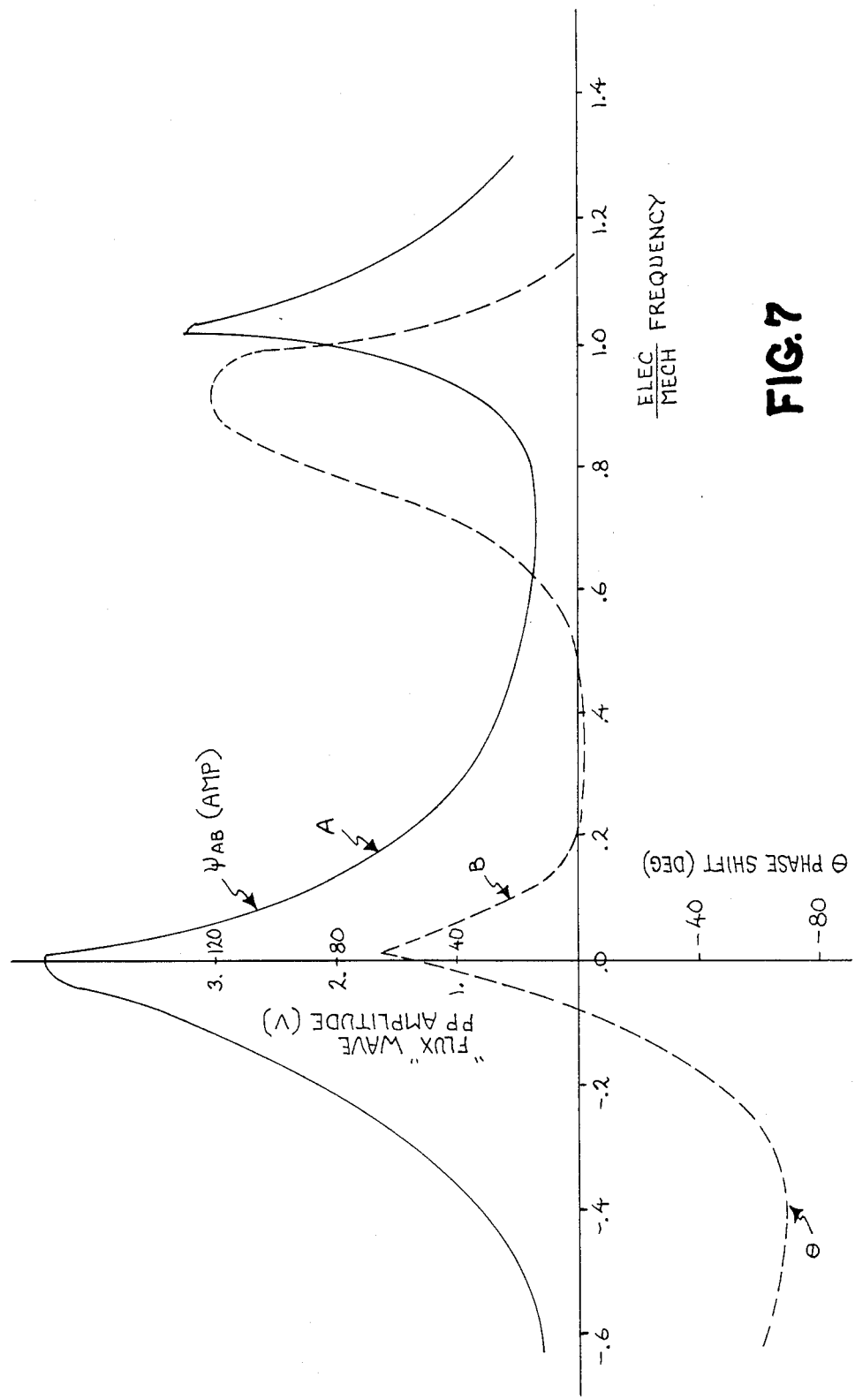
FIG. 7 illustrates waveforms helpful in explaining the operation of the present invention.

Referring now to curve A of FIG. 7 the flux peak to peak amplitude versus open loop frequency is shown. The abscissa is shown normalized to the mechanical frequency. The induction motor was driven at 200 rpm with constant current in the DC link. A sharp peak with excellent signal to noise ratio occurs in the flux wave when the open loop frequency is slightly greater than the mechanical frequency. The peak at zero frequency occurs since the flux was obtained by integrating motor voltage without correcting for the IR voltage drops at low speeds.

While an open loop frequency scan could use either increasing or decreasing frequency, currently the scan is started from maximum forward frequency. For a reversible drive the frequency scan can be continued to a maximum reverse frequency. In the present embodiment the scan is stopped at a small forward frequency corresponding to a nominal slip frequency.

Referring now to curve B of FIG. 7, an alternative to detecting peak flux in the open loop scan mode is to use the motor power factor (or its equivalent determined from the appropriate motor flux to current angle). When the power factor goes from leading to lagging, the scan is stopped and the phase-locked loop is synchronized. Curve B is shown as the motor flux current data phase shift in degrees versus the normalized electrical to mechanical frequency. The angle $\theta$ is measured between the zero crossing of the line A to line B flux and the initiation of current in the thyristors connected to the A phase of the motor.

The foregoing describes a control for open loop start-up induction motor drive rotating at any initial speed and capable of smoothly transitioning to closed loop control.

While the invention has been particularly shown and described with reference to a preferred embodiment thereof, it will be understood by those skilled in the art that various changes in form and details may be made therein without departing from the spirit and scope of the invention.

What is claimed is:

1. A method of starting an AC motor from any initial speed using open loop central, comprising the steps of:
   providing sufficient current to the AC motor so that motor flux can be developed;
   varying the frequency provided to the stator of the AC motor;
   determining the stator frequency at which motor peak flux occurs; and
   transitioning to a control responsive to an external command at approximately the stator frequency at which the peak flux occurred.

2. The method of claim 1 wherein said step of determining the frequency at which the motor peak flux occurs comprises the steps of measuring motor voltage and integrating motor voltage to obtain motor flux.

3. The method of claim 1 wherein said step of varying the stator frequency comprises the steps of varying stator frequency from a maximum stator frequency downward.

4. The method of claim 1 wherein said AC motor is an induction motor.

5. A method of starting an AC motor from any initial speed using open loop control, comprising the steps of:

providing sufficient current to the AC motor so that motor flux can be developed;

varying the frequency provided to the stator of the AC motor;

determining the frequency at which the motor peak flux occurs; and transitioning to closed loop control at approximately the stator frequency at which the peak flux occurred.

6. The method of claim 5 wherein said step of transitioning to closed loop control comprises the steps of ceasing the varying of the stator frequency, synchronizing a phase-locked loop to the zero crossings of the flux waves and varying motor speed responsive to a commanded value.

7. The method of claim 5 wherein said step of determining the frequency at which the motor peak flux occurs comprises the steps of measuring motor voltage and integrating motor voltage to obtain motor flux.

8. The method of claim 5 wherein said step of varying the rotor frequency comprises the steps of varying stator frequency from a maximum stator frequency downward.

9. The method of claim 5 wherein said AC motor is an induction motor.

10. A method of starting an AC motor from any initial speed using open loop control, comprising the steps of:

providing sufficient current to the AC motor so that motor flux can be developed;

varying the frequency provided to the stator of the AC motor;

determining when the motor power factor changed from leading to lagging; and transitioning to a control responsive to an external command at approximately the stator frequency at which the change in power factor occurred.

11. The method of claim 10 wherein said step of determining when motor power factor changed from leading to lagging comprises measuring the motor flux to current angle and determining when the angle changes from leading to lagging.

* * * * *